United States Patent
Fitzpatrick et al.

(10) Patent No.: US 6,833,712 B2
(45) Date of Patent: Dec. 21, 2004

(54) DIFFERENTIATING BETWEEN BOARD-INSERTION POWER-ON AND CHASSIS POWER-ON

(75) Inventors: Brian Fitzpatrick, Arlington Heights, IL (US); Dwight Dipert, Fox River Grove, IL (US); Russ Panzarella, Arlington Heights, IL (US)

(73) Assignee: 3Com Corporation, Marlborough, MA (US)

( * ) Notice: Subject to any disclaimer, the term of this patent is extended or adjusted under 35 U.S.C. 154(b) by 57 days.

(21) Appl. No.: 10/256,772

(22) Filed: Sep. 27, 2002

(65) Prior Publication Data

US 2004/0061505 A1 Apr. 1, 2004

(51) Int. Cl.[7] .............. G01R 31/08; G01R 31/02; G01R 19/00; H05K 7/10

(52) U.S. Cl. .............. 324/522; 324/422; 324/66; 710/301; 710/302

(58) Field of Search .................. 324/522, 512, 324/537–538, 556, 66, 48; 340/649, 654; 439/639; 710/301, 302; 361/748

(56) References Cited

U.S. PATENT DOCUMENTS

| | | | | |
|---|---|---|---|---|
| 3,699,562 A | * | 10/1972 | Kelly | 340/649 |
| 3,993,935 A | * | 11/1976 | Phillips et al. | 361/748 |
| 4,835,737 A | * | 5/1989 | Herrig et al. | 710/302 |
| 5,881,251 A | * | 3/1999 | Fung et al. | 710/302 |
| 6,101,322 A | * | 8/2000 | Goodrum et al. | 710/302 |
| 6,430,633 B1 | | 8/2002 | Voloshin | 710/100 |
| 6,651,138 B2 | * | 11/2003 | Lai et al. | 711/115 |
| 6,661,236 B2 | * | 12/2003 | Goers et al. | 324/537 |

* cited by examiner

Primary Examiner—Anjan K. Deb
(74) Attorney, Agent, or Firm—McDonnell Boehnen Hulbert & Berghoff LLP

(57) ABSTRACT

A system for detecting a board-insertion power-on versus a chassis power-on is disclosed. By using recessed circuit board sense contacts, recessed chassis sense contacts, or equivalent, a circuit can detect when power reaches a circuit board's power contacts before the circuit board sense contacts mate with corresponding chassis sense contacts. On the other hand, if a circuit board is fully seated when chassis power is first applied, the circuit will not detect that power has reached the power contacts before the sense contacts are mated, resulting in a different output. The circuit can include a latch, the output of the latch representing either a board-insertion power-on or a chassis power-on. The output of the latch can be used to modify a software or hardware condition or state, resulting in improved operation.

19 Claims, 3 Drawing Sheets

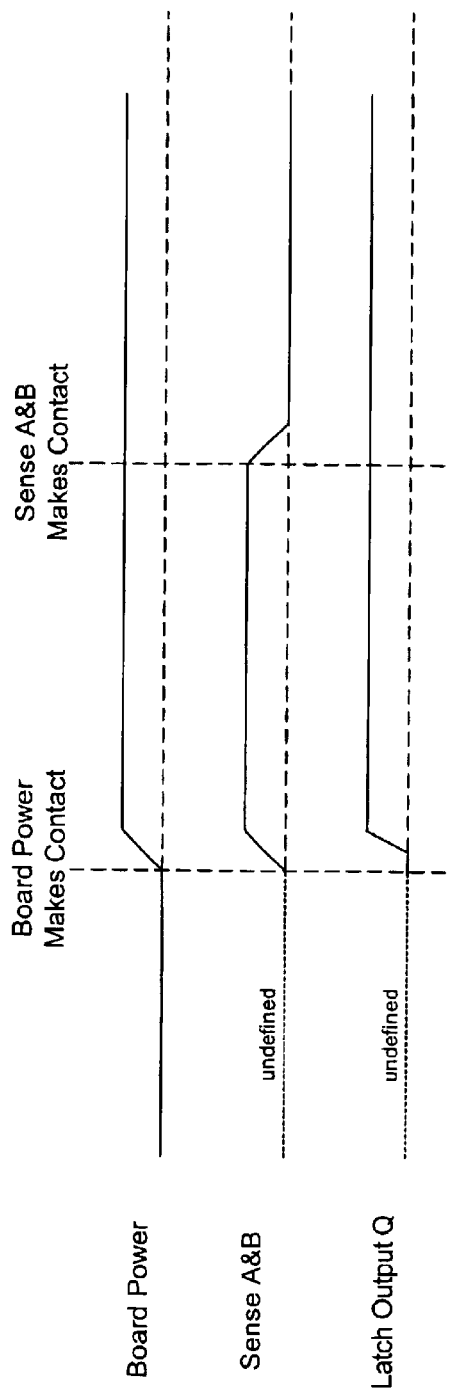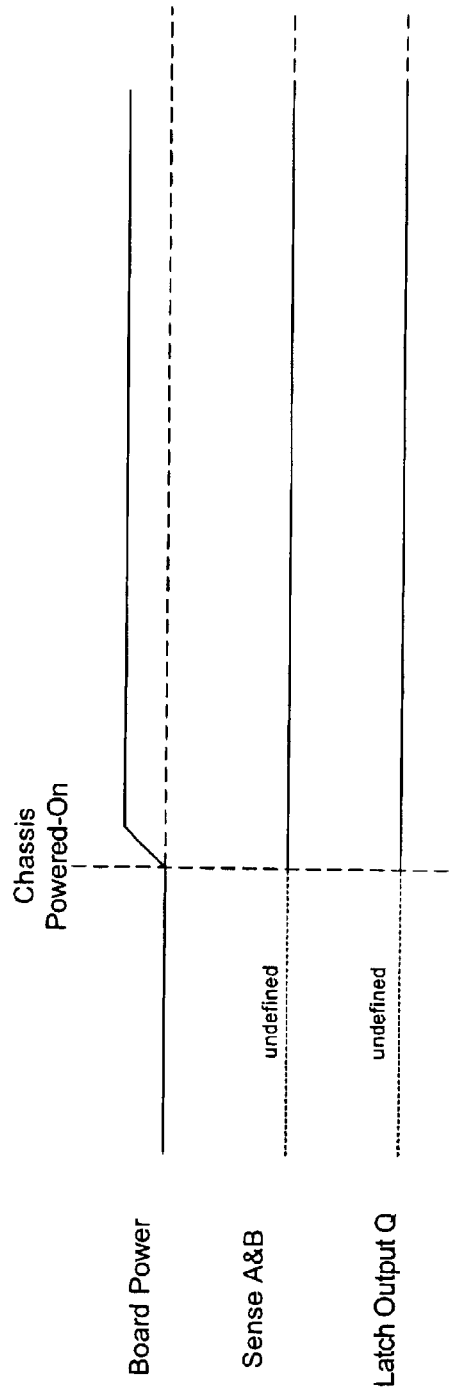

DIFFERENTIATING BETWEEN BOARD-INSERTION POWER-ON AND CHASSIS POWER-ON

BACKGROUND

1. Technical Field

The present system relates generally to telecommunications and, more particularly, to any IP telecommunication technology, such as Voice over IP (VoIP) services.

2. Description of Related Art

As technology has advanced, making high-speed digital data communication networks (such as the Internet) widely available, the networks are being used for applications that are more diverse. Initially, the Internet was designed to carry data that were digital in nature, such as text files. With such digital files, Internet data transfers were satisfactory as long as the full file reached its destination in a reasonable time. Today, however, many new applications are placing real-time demands on the Internet. For example, when voice, music, video and still images are transferred, the timing of data arrival becomes crucial (or at least much more important) to the network's usefulness in carrying the information.

In addition to the timing of data arrival, lost information, in the form of dropped packets, is unacceptable to a business that wishes to provide its customers with Voice-over-IP (VoIP) or video-over-IP in competition with legacy suppliers of these services, such as local exchange carriers and cable television providers. The importance of satisfying the needs of bandwidth-hungry applications that are crucial to the business of providers (i.e., mission-critical applications) has given rise to QoS (Quality of Service) mechanisms or controls. QoS simply means that there is some quantifiable measure of the level of service being provided. For example, packet loss rate, a maximum delay rate, a guaranteed minimum bandwidth, or a maximum allowed bandwidth, etc., may be used to measure a network's QoS.

As high QoS becomes more important to customers, mission-critical network applications require highly reliable connections between network elements. One way to ensure high QoS is to provide 1-to-1 redundancy for each network element whose failure could result in a reduced QoS. For example, for a network element such as a packet data serving node (PDSN) board, each PDSN board can have a partner that serves as a backup.

Switching a communications network element out of service and switching to a backup element in its place is known as "switchover". Switchover is used to implement redundancy and thus help ensure high QoS. When the out of service element recovers or is replaced, it may be switched back into service ("revertive switchover"). Switchover may be accomplished using redundancy relays that are connected so that when a redundancy relay associated with a main or standby board is energized, the board will not terminate traffic. Without a method of specifically controlling when redundancy relays are energized and de-energized, however, power consumed by the relays can be relatively high if the default mode is to energize them. Energizing the relays as a default condition may be preferred, however, because it prevents interference with received and transmitted signals when switching between main and standby boards when a board is inserted into a powered chassis that is terminating traffic. Thus, a system that can control switchover mode more effectively than a fail-safe default mode is needed.

SUMMARY

In one aspect, a system for detecting an insertion power-on of a circuit board is disclosed. The circuit board has at least one circuit board sense contact, and is insertable into a chassis. The method includes making a determination that electrical power is supplied to the circuit board before the circuit board sense contact makes contact with at least one chassis sense contact. The method further includes generating an electrical signal in response to the determination.

In another aspect, at least one circuit board sense contact can be recessed relative to one or more circuit board electrical power contacts, so that making the determination comprises detecting a voltage at a circuit board sense contact after the circuit board electrical power contact engages a chassis electrical power contact.

In another aspect, an apparatus for detecting a board-insertion power-on is disclosed. The apparatus includes a circuit board that is insertable into a chassis. The circuit board may include at least one connector, the at least one connector comprising at least one circuit board sense contact and a circuit board electrical power contact.

Upon insertion of the circuit board into the chassis, the circuit board electrical power contact will make contact with a mating chassis electrical power contact on the chassis and the at least one circuit board sense contact will make contact with a mating at least one chassis sense contact. By design, the electrical power contacts make contact before the sense contacts. When the circuit board electrical power contact and the chassis electrical power contact have made contact and the at least one circuit board sense contact but the at least one chassis sense contact has not made contact, a first voltage exists on the at least one circuit board sense contact. A second voltage exists on the at least one circuit board sense contact when the at least one circuit board sense contact makes contact with the at least one chassis sense contact.

The apparatus also includes a voltage detection circuit for detecting voltage on the at least one circuit board sense contact.

BRIEF DESCRIPTION OF THE SEVERAL VIEWS OF THE DRAWINGS

Exemplary embodiments of the present system are described herein with reference to the drawings, in which:

FIG. 3A is a timing diagram illustrating logic signals representative of a board insertion power-on; and FIG. 3B is a timing diagram illustrating logic signals representative of a chassis power-on.

DETAILED DESCRIPTION OF AN EXEMPLARY EMBODIMENT

Upon power-on of a circuit board such as a PDSN modem element in a multiple-board chassis, a redundancy relay that controls traffic received by and transmitted from the board can be energized to ensure traffic is not terminated until chassis and board status information is available. For example, in a system where redundant or standby boards provide backup to main boards, if a main board has been repaired and is inserted while the chassis is powered-on and a standby board is handling traffic that would otherwise be handled by the main board, the default power-on mode for the inserted board could be to energize the redundancy relay to prevent loading received signals that are already terminated by the standby board, and to prevent collisions between the transmitters of the standby and main boards.

For the case where boards are inserted into a powered-on chassis, a default mode as described above does not create problems. However, when the default power-on mode is to energize a redundancy relay when a board first receives power, high power consumption by the relays results when a chassis is powered on because all the boards' redundancy relays will be energized even if the configuration does not require it. Thus, a system for controlling redundancy relays depending on the type of power-on, either board insertion or chassis power-on, could reduce power consumption by the relays upon chassis power-on, and could accordingly simplify power supply design, size, and weight. Specifically, all redundancy relays on boards already in place in a chassis can safely be de-energized upon chassis power-on since there is no data traffic to terminate. Once powered on, a control or management circuit that is in the chassis or remotely located can command some or all boards in the chassis to energize their redundancy relays as required to begin terminating traffic.

Figure 1:
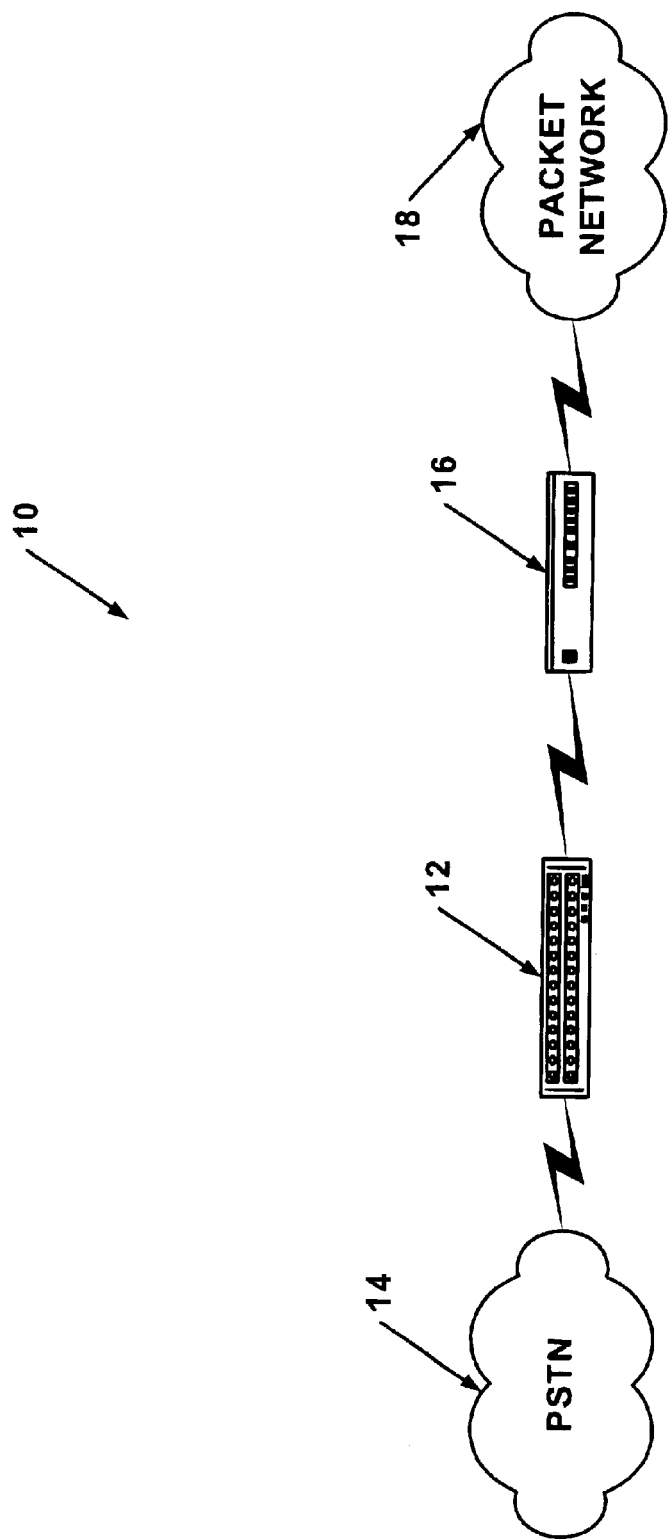
FIG. 1 illustrates a system in which an exemplary embodiment of the present system can be implemented.

Referring now to the drawings, FIG. 1 illustrates a voice-over-IP (VoIP) system 10 in which an exemplary embodiment of the present system may be employed. As shown in FIG. 1, system 10 includes a media gateway 12 interconnected to a Public-Switched Telephone Network (PSTN) 14 and, via an optional external router 16, to a packet network 18. Media gateway 12 serves as an interface between the PSTN and IP network, and it may typically digitize, encode, and compress originating voice traffic (i.e., ingress traffic) into packets for transport over managed IP networks. Media gateway 12 may also decompress, decode, and reassemble terminating voice traffic (i.e., egress traffic) for handoff to PSTN 16 via the local carrier's network. Media gateway 12 is a functional more than a physical entity, although it may be a standalone (physical) device. Media gateway 12's functionality may be provided, for example, by one or more shelves in a Total Control 2000 multimedia access platform, as produced by the Commworks division of 3Com Corporation.

As used herein, the term "redundancy relay" can represent one or more physical relays. For example, a DS-3 board in the Total Control 2000 platform has a set of seven redundancy relays that may be operated individually or in parallel to terminate traffic on some or all channels, or to switch the board out of operation. One possible way to operate redundancy relays is to connect them so that they conduct signals (that is, terminate traffic) when they are de-energized. In operation, if a main circuit board in a chassis fails or is taken offline, a standby board's redundancy relay will be de-energized, and the standby board will begin to terminate traffic. At or about the same time, the main board's redundancy relay will be energized, isolating the main board from traffic and from the standby board.

Redundancy relays may be used to switch between any one of a number of main and standby modem elements. For example, switchover may be used for n+1 redundancy, where any of n main modem modules are backed-up by one standby module. Alternatively, the mechanism may be used for 1+1 redundancy, where each main modem element is backed-up by one standby modem element. Switchover may provide a loss-free or nearly loss-free transfer between modem elements or other network elements. An exemplary embodiment of the system can provide improved control for redundancy relays, but the system could also be used wherever information regarding a circuit board's power-on state allows for improved operation.

Figure 2:
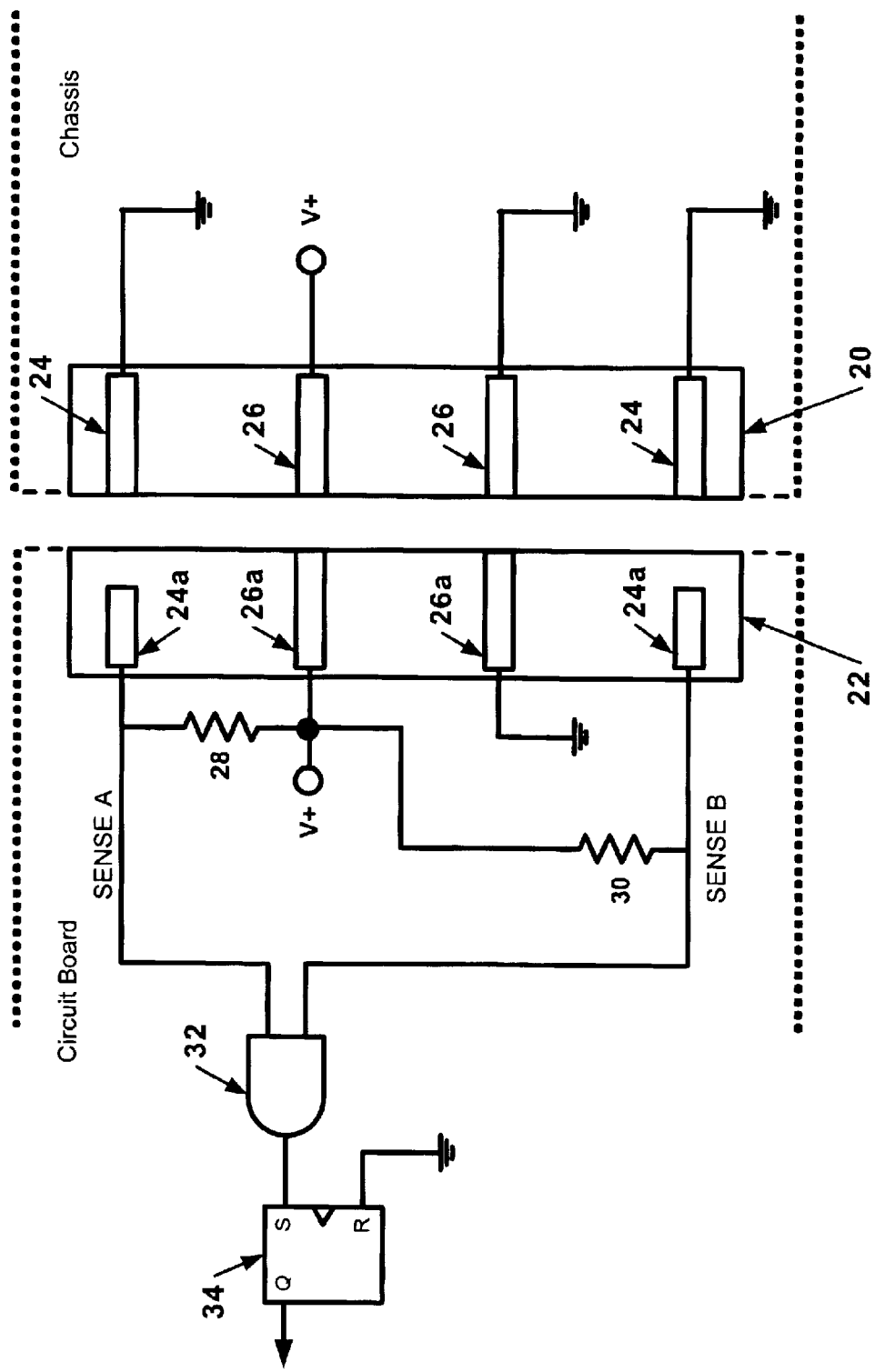
FIG. 2 is a schematic illustrating an exemplary embodiment of the present system.

FIG. 2 is a schematic diagram of a circuit board and chassis in which an exemplary embodiment of the system may be used. The circuit board and chassis may comprise, for example, a media gateway such as media gateway 12 of FIG. 1. As shown, the chassis (such as a data shelf or control shelf of a Total Control 2000 platform) may include a connector 20 for accepting a mating connector 22 of the circuit board. The connector 20 may in turn include one or more chassis sense contacts 24 and two or more power contacts 26, in addition to a number of signal contacts (not shown). In the exemplary embodiment, circuit board connector 22 may include one or more circuit board sense contacts 24a and two or more power contacts 26a that mate with the corresponding contacts of connector 20 as shown. By design, the power contacts of connectors 20 and 22 are the first to make contact when the circuit board is inserted into the chassis. The next contacts to engage are the signal contacts, and the last to engage are the sense contacts. This sequential mating of connector contacts can be accomplished by using different length pins or sockets on either the chassis connector or the circuit board connector. In the exemplary embodiment, a total pin length difference of 2 to 3 mm is sufficient, although this distance is not necessarily critical to all embodiments of the system.

Sense contacts 24a are connected to pull-up resistors 28 and 30. Although the circuit board sense lines could be interchangeable, for purposes of illustration they may be referred to as "SENSE A" and "SENSE B". SENSE A and SENSE B are used to drive an AND gate 32, which, in conjunction with an S/R latch 34, comprises a detection circuit that may be used to control redundancy relays and provide power-on status information to software or other circuitry. AND gate 32 and S/R latch 34 can be CMOS logic components, although other logic types, such as TTL, ECL, BiCMOS, or discrete logic could be used.

In operation, when a circuit board as shown is inserted into a chassis that is already powered on, the power contacts on the circuit board are the first to make contact with the power contacts on the chassis. Before the circuit board is fully inserted, the recessed sense contacts 24a will not have made contact with sense contacts 24 on the chassis. Thus, resistor 28 can pull SENSE A high, and resistor 30 can pull SENSE B high. Using two sense contacts 24a at opposite ends of connector 22 can prevent sense errors that might occur if a circuit board is inserted at an angle (i.e., allowing one sense contact to engage its mate at about the same time as the power contacts engage), although one sense contact could also work.

Since SENSE A and SENSE B are pulled high and power is on the circuit board, the inputs to AND gate 32 will be high, and accordingly so will the SET input of S/R latch 34. When the circuit board is inserted fully, chassis sense contacts 24 and circuit board 24a will engage, pulling SENSE A and B low via the ground connection of chassis sense contacts 24. As the timing chart of FIG. 3A illustrates, pulling SENSE A and SENSE B low in the scenario described has no effect on the output Q of latch 34; so as long as the circuit board remains powered, output Q will be high, representing a board-insertion power-on. This output can be used directly to control hardware, such as redundancy relays as described above. The output can also be used to provide power-on state information to software.

In the system as described, for example, when output Q is high, the redundancy relay of the inserted board would be energized to prevent the board from terminating traffic. In contrast, when a circuit board is already in place before a chassis is powered on, SENSE A and SENSE B will always be low. Accordingly, the input to latch 34 will remain low, and latch 34's output Q will be latched low, representing a chassis power on. This condition is illustrated by the timing chart of FIG. 3B. A low logic level on output Q can be used to prevent a redundancy relay from automatically energizing when a board is powered up. Instead, a redundancy relay will energize after a chassis power up when it is commanded on by other logic, such as may be received from a Total Control 2000 shelf controller.

Other logic configurations than the one described are possible. For example, sense contacts 24 could be connected to a voltage on the chassis backplane, while sense contacts 24a could be connected to pull-down resistors on the circuit board, as long as the corresponding logic performed by AND gate 32 and S/R latch 34 is modified accordingly.

Those skilled in the art will appreciate that many of the elements described in this exemplary embodiment are functional entities that may be implemented as discrete components or in conjunction with other components, in any suitable combination and location. Exemplary embodiments of the present system have been illustrated and described. It will be understood, however, that changes and modifications may be made to the system without deviating from the spirit and scope of the system, as defined by the following claims.

We claim:

1. A method of detecting an insertion power-on of a circuit board having at least one circuit board sense contact, the circuit board being insertable into a chassis, the method comprising:

making a determination that electrical power is supplied to the circuit board before the at least one circuit board sense contact makes contact with at least one chassis sense contact;

generating an electrical signal in response to the determination; and latching the electrical signal to create a power-on state signal, wherein (i) the making a determination function, (ii) the generating function, and (iii) the latching function are performed by circuit board components.

2. The method of claim 1, wherein the at least one circuit board sense contact contacts the at least one chassis sense contact after a circuit board electrical power contact makes contact with a chassis electrical power contact; and wherein making the determination comprises detecting a voltage at the at least one circuit board sense contact between the time the circuit board electrical power contact makes contact with the chassis electrical power contact and the time the at least one circuit board sense contact makes contact with the at least one chassis sense contact.

3. The method of claim 2, wherein the at least one circuit board sense contact comprises two circuit board sense contacts; and wherein the at least one chassis sense contact comprises two chassis sense contacts.

4. The method of claim 3, wherein making the determination further comprises determining that electrical power is supplied to the circuit board before two circuit board sense contacts make contact with two chassis sense contacts.

5. The method of claim 4, wherein determining that electrical power is supplied to the circuit board before two circuit board sense contacts make contact with two corresponding chassis sense contacts comprises logically combining voltage outputs from at least two circuit board sense contacts.

6. A method of detecting an insertion power-on of a circuit board having at least two circuit board sense contacts, the circuit board being insertable into a chassis, the method comprising:

making a determination that electrical power is supplied to the circuit board before the at least two circuit board sense contacts make contact with at least two corresponding chassis sense contacts;

wherein the at least two circuit board sense contacts make contact with the at least two corresponding chassis sense contacts after a circuit board electrical power contact makes contact with a chassis electrical power contact; and wherein making the determination comprises detecting voltage at the at least two circuit board sense contacts after the circuit board electrical power contact makes contact with the chassis electrical power contact;

logically combining signals from the at least two circuit board sense contacts to create a sense output signal; and latching the sense output signal to create a power-on state signal;

wherein the power-on state signal defines whether the circuit board is inserted into a powered-on chassis or whether a chassis was powered on while the circuit board was in place in the chassis, wherein (i) the making a determination function, (ii) the logically combining function, and (iii) the latching function are performed by circuit board components.

7. Apparatus for detecting a board-insertion power-on comprising:

a circuit board, the circuit board being insertable into a chassis;

at least one connector on the circuit board, the at least one connector comprising at least one circuit board sense contact and a circuit board electrical power contact;

wherein, upon insertion of the circuit board into the chassis, the circuit board electrical power contact will make contact with a mating chassis electrical power contact on the chassis and receive electrical power, and the at least one circuit board sense contact will make contact with a mating at least one chassis sense contact, the electrical power contacts making contact before the sense contacts; and wherein, when the circuit board electrical power contact and the chassis electrical power contact have made contact and the at least one circuit board sense contact and the at least one chassis sense contact have not made contact, a first voltage exists on the at least one circuit board sense contact and wherein a second voltage exists on the at least one circuit board sense contact when the at least one circuit board sense contact makes contact with the at least one chassis sense contact; and a voltage detection circuit on the circuit board for detecting voltage on the at least one circuit board sense contact, wherein an output of the voltage detection circuit comprises a state signal that defines the power-on state of the circuit board.

8. The apparatus of claim 7, further comprising an impedance connected between the at least one circuit board sense contact and a circuit board sense voltage, and wherein the at least one chassis sense contact is connected to a chassis sense voltage.

9. The apparatus of claim 7, wherein the at least one circuit board sense contact is recessed.

10. The apparatus of claim 7, wherein the at least one chassis sense contact is recessed.

11. The apparatus of claim 7, wherein the voltage detection circuit comprises a latch, and wherein the latch maintains the state signal.

12. The apparatus of claim 11, wherein the at least one circuit board sense contact comprises two circuit board sense contacts and wherein the voltage detection circuit further comprises a logic circuit having at least two inputs conductively coupled to the at least two circuit board sense contacts.

13. The apparatus of claim 12, wherein:

the latch comprises an S/R latch; and wherein the logic circuit comprises an AND gate, the output of the AND gate being connected to the SET input of the S/R latch.

14. The apparatus of claim 11, wherein the output of the latch defines either a board power-on or a chassis power-on.

15. Apparatus for detecting a board-insertion power-on comprising:

a circuit board, the circuit board being insertable into a chassis;

at least one connector on the circuit board, the at least one connector comprising at least two circuit board sense contacts and a circuit board electrical power contact, the at least two circuit board sense contacts being recessed relative to the circuit board electrical power contact;

at least two impedances connected between the at least two circuit board sense contacts and a circuit board supply voltage;

at least two chassis sense contacts matable with the at least two circuit board sense contacts, the at least two chassis sense contacts connected to a chassis ground;

wherein, upon insertion of the board into the chassis, the circuit board electrical power contact will make contact with a mating chassis electrical power contact on the chassis and receive electrical power, and the at least two circuit board sense contacts will make contact with the mating at least two chassis sense contacts, the electrical power contacts making contact before the sense contacts; and wherein, when the circuit board electrical power contact and the chassis electrical power contact have made contact and the at least two circuit board sense contacts and the at least two chassis sense contacts have not made contact, a first voltage exists on the at least two circuit board sense contacts and wherein a second voltage exists on the at least two circuit board sense contacts when the at least two circuit board sense contacts make contact with the at least two chassis sense contacts; and a voltage detection circuit on the circuit board for detecting voltage on the at least two circuit board sense contacts, the voltage detection circuit comprising an S/R latch and an AND gate, wherein the inputs to the AND gate are connected to the at least two circuit board sense contacts and wherein the output of the AND gate is connected to an input of the S/R latch;

wherein the output of the latch defines either a board power-on or a chassis power-on.

16. A method of detecting an insertion power-on of a circuit board having at least one circuit board sense contact, the circuit board being insertable into a chassis, the method comprising:

making a determination that electrical power is supplied to the circuit board due to insertion of the circuit board into a powered-on chassis, wherein the determination is made in response to signals on the at least one circuit board sense contact;

generating an electrical signal in response to the determination;

latching the electrical signal to create a power-on state signal; and configuring the circuit board to selectively terminate communications traffic in response to the power-on state signal, wherein (i) the making a determination function, (ii) the generating function, (iii) the latching function, and (iv) the configuring function are performed by circuit board components.

17. The method of claim 16, wherein configuring the circuit board comprises controlling hardware on the circuit board.

18. The method of claim 16, wherein configuring the circuit board includes providing the power-on state signal to software.

19. The method of claim 16, wherein the communications traffic comprises voice traffic.

* * * * *